(12) United States Patent
Facci et al.

(10) Patent No.: US 10,099,421 B2
(45) Date of Patent: Oct. 16, 2018

(54) 3-D PRINTING USING INTERMEDIATE TRANSFER BELT AND CURABLE POLYMERS

(71) Applicant: Xerox Corporation, Norwalk, CT (US)

(72) Inventors: John S. Facci, Webster, NY (US); David C. Craig, Pittsford, NY (US); David S. Derleth, Webster, NY (US); Eliud Robles Flores, Rochester, NY (US); Varun Sambhy, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 118 days.

(21) Appl. No.: 15/152,631

(22) Filed: May 12, 2016

(65) Prior Publication Data

US 2017/0326794 A1    Nov. 16, 2017

(51) Int. Cl.
*B29C 67/00* (2017.01)
*B29C 64/245* (2017.01)
(Continued)

(52) U.S. Cl.
CPC ............ *B29C 64/245* (2017.08); *B29C 47/06* (2013.01); *B29C 64/141* (2017.08);
(Continued)

(58) Field of Classification Search
CPC ......... B33Y 10/00; B33Y 30/00; B29C 64/20; B29C 64/264; B29C 64/268;
(Continued)

(56) References Cited

U.S. PATENT DOCUMENTS 7,184,698 B2    2/2007  Tombs
7,250,238 B2 *  7/2007  Fromm ................. C08F 212/08
                                                      427/510
(Continued)

FOREIGN PATENT DOCUMENTS

CN       104890241 A       9/2015
CN       104890241 B   *   6/2017   ........... G03G 15/224
WO       2015133641 A1     9/2015

OTHER PUBLICATIONS

CN 104890241B translation CN to ENG (Year: 2015).*
20151181EP01, European Application No. 17169600.8, European Search Report dated Sep. 7, 2017, pp. 1-7.

*Primary Examiner* — Seyed Masoud Malekzadeh
*Assistant Examiner* — Lawrence D. Hohenbrink, Jr.
(74) *Attorney, Agent, or Firm* — Gibb & Riley, LLP

(57) ABSTRACT

3-D printing transfers build material and support from an intermediate transfer belt (ITB) to a platen. The build material is the same as the support material, except that the build material includes a photoinitiator and the support material does not. The platen moves to make contact with the ITB, and the ITB transfers successive layers of build material and support material each time the platen contacts the ITB. The platen and a portion of the ITB that is adjacent the platen are heated prior to the platen contacting the ITB, and the same is exposed so as to crosslink polymers of build material, without crosslinking polymers of support material. The polymers of build material being crosslinked and the polymers of support material not being crosslinked makes the support material selectively soluble in a solvent.

20 Claims, 14 Drawing Sheets

(51) Int. Cl.
　　　*B29C 64/379*　　　(2017.01)
　　　*B29C 47/06*　　　(2006.01)
　　　*G03G 15/16*　　　(2006.01)
　　　*G03G 15/22*　　　(2006.01)
　　　*B33Y 70/00*　　　(2015.01)
　　　*B29C 64/141*　　　(2017.01)
　　　*B29C 64/40*　　　(2017.01)
　　　*B29C 64/118*　　　(2017.01)
　　　*B29C 64/153*　　　(2017.01)
　　　*B29C 64/264*　　　(2017.01)
　　　*B29C 64/20*　　　(2017.01)
　　　*B29C 64/147*　　　(2017.01)
　　　*B29C 64/268*　　　(2017.01)
　　　*B29C 64/106*　　　(2017.01)
　　　*B33Y 10/00*　　　(2015.01)
　　　*B33Y 30/00*　　　(2015.01)
　　　*B29C 64/35*　　　(2017.01)

(52) U.S. Cl.
　　　CPC ............ *B29C 64/379* (2017.08); *B29C 64/40* (2017.08); *B33Y 70/00* (2014.12); *G03G 15/1605* (2013.01); *G03G 15/225* (2013.01); *B29C 64/106* (2017.08); *B29C 64/118* (2017.08); *B29C 64/147* (2017.08); *B29C 64/153* (2017.08); *B29C 64/20* (2017.08); *B29C 64/264* (2017.08); *B29C 64/268* (2017.08); *B29C 64/35* (2017.08); *B33Y 10/00* (2014.12); *B33Y 30/00* (2014.12)

(58) Field of Classification Search
　　　CPC ... B29C 64/106; B29C 64/118; B29C 64/141; B29C 64/147; B29C 64/153; B29C 67/0051; B22F 3/008; G03G 15/14; G03G 15/224; B29K 2105/251
　　　USPC ........................ 425/174.4, 375; 399/320, 336
　　　See application file for complete search history.

(56) References Cited

U.S. PATENT DOCUMENTS

| | | |
|---|---|---|
| 7,270,408 B2 | 9/2007 | Odell et al. |
| 7,851,549 B2 | 12/2010 | Sacripante et al. |
| 8,470,231 B1 | 6/2013 | Dikovsky et al. |
| 8,488,994 B2 | 7/2013 | Hanson et al. |
| 9,193,110 B2 | 11/2015 | Pridoehl et al. |
| 2013/0075013 A1 | 3/2013 | Chillscyzn et al. |
| 2013/0078013 A1* | 3/2013 | Chillscyzn ........... G03G 15/169 399/307 |
| 2013/0186558 A1* | 7/2013 | Comb ................. B29C 67/0051 156/277 |
| 2014/0134334 A1 | 5/2014 | Pridoehl et al. |
| 2015/0024309 A1 | 1/2015 | Martin |
| 2015/0142159 A1 | 5/2015 | Chang |
| 2015/0145174 A1 | 5/2015 | Comb |
| 2016/0243764 A1* | 8/2016 | Hays ................... B29C 67/0074 |
| 2017/0192377 A1* | 7/2017 | Batchelder ............ B33Y 30/00 |

\* cited by examiner

US 10,099,421 B2

3-D PRINTING USING INTERMEDIATE TRANSFER BELT AND CURABLE POLYMERS

BACKGROUND

Systems and methods herein generally relate to three dimensional (3-D) printing processes that use ultra-violet (UV) curable polymers.

Three-dimensional printing can produce objects using, for example, ink-jet or electrostatic printers. In one exemplary three-stage process, a pulverulent material is printed in thin layers, a UV-curable liquid is printed on the pulverulent material, and finally each layer is hardened using a UV light source. These steps are repeated layer-by-layer. Support material generally comprises acid-, base- or water-soluble polymers, which can be selectively rinsed from the build material after 3-D printing is complete.

Therefore, production of parts using a three-dimensional (3-D) process is predicated on the deposition of a build material, from which the part itself is produced, and a support material, which fill voids and cavities in the part and whose function is to provide mechanical support to the build material. The support material is removed to leave behind only the part that is desired. One way to approach this is to dissolve away the support material.

SUMMARY

Exemplary three-dimensional (3-D) printers herein include (among other components, an intermediate transfer belt (ITB), a first photoreceptor transferring a first material (e.g., build material) to the ITB, and a second photoreceptor transferring a second material (e.g., support material) to the ITB. Exposure and development devices transfer build material to the first photoreceptor and support material to the second photoreceptor. The build material is the same as the support material, except that the build material includes a photoinitiator and support material does not include the photoinitiator. The build material and the support material both comprise ultra-violet (UV) crosslinkable polymer toners that use the photoinitiator to crosslink. The layer of the first material and the second material is on a discrete area of the ITB and is in a pattern.

Such printers also include a platen moving relative to the ITB to make contact with the ITB. The ITB transfers successive layers of build material and support material to the platen each time the platen contacts the ITB, and this process eventually builds a 3-D object on the platen.

At least one heater is also included in such structures, and the heater heats the platen and heats a portion of the ITB that is adjacent the platen to the glass transition temperature of build material and support material prior to the platen contacting the ITB. The heater further heats build material and support material on the platen to a temperature between the glass transition temperature and the melting temperature of build material and support material after the ITB transfers build material and support material to the platen, and this fuses the build material and support material to previously transferred material on the platen.

Such printers also include a light (e.g., UV light source). The platen moves from the ITB to the light, and then the light exposes build material and support material on the platen after each time the platen contacts the ITB, and this crosslinks polymers of the build material without crosslinking polymers of the support material. Various systems herein include a rinsing station that applies solvent to the 3-D object to dissolve only the support material and to leave the build material unaffected. The polymers of build material being crosslinked and the polymers of support material not being crosslinked makes support material selectively soluble in different solvents than the build material.

Methods of performing 3-D printing herein transfer first material (e.g., build material) to a first photoreceptor and second material (e.g., support material) to a second photoreceptor using exposure and development devices, and then transfer build material from the first photoreceptor and support material from the second photoreceptor to an intermediate transfer belt (ITB). The build material is the same as the support material, except that the build material includes a photoinitiator and the support material does not include the photoinitiator. For example, the build material and support material can comprise ultra-violet (UV) crosslinkable polymer toners that use the photoinitiator to crosslink.

Such processes move a platen relative to the ITB to be adjacent the ITB. These methods also heat the platen and heat a portion of the ITB that is adjacent the platen using a heater. After heating, such methods move the platen to contact ITB. Successive contacts between the ITB and platen transfer successive layers of build material and support material to the platen (each time the platen contacts the ITB) and this successively builds the 3-D object on the platen.

Methods herein move the platen from the ITB to a light (e.g., UV light source) and then expose the build material and support material using the light, after each time the platen contacts the ITB, so as to crosslink polymers of build material, without crosslinking polymers of support material.

Subsequent processing removes the 3-D object of build material and support material from the platen after all the successive layers are transferred, and applies solvent to the 3-D object using a rinsing station to dissolve only the support material and to leave the build material unaffected. The polymers of build material being crosslinked and the polymers of support material not being crosslinked make the support material selectively soluble in the solvent (relative to the build material).

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, some 3-D processes are predicated on layer-by-layer transfuse of the build and support material, and the materials may have similar melt rheological properties and hence similar chemical structures. This makes separation by dissolution a difficult task.

Therefore, the systems and methods herein provide 3-D parts that may be fabricated by any of multiple additive manufacturing processes in common usage in which the part is built up by sequential layer-by-layer deposition of a suitable plastic build material and plastic support. In general 3-D parts are built from a digital representation of the part which is divided into multiple horizontal slices. Instructions for printing individual layers are sent by a controller to the print process to form any given layer.

One exemplary 3-D printing process where the materials may have similar melt rheological properties (and hence similar chemical structures) develops build and support toner materials onto an intermediate transfer belt (ITB). The developed layers of these toner materials are transfused to a moving platen. The developed layer and ITB are locally heated to bring the developed layer to a "tacky" state prior to transfuse (i.e., to a temperature higher than the glass transition temperature (Tg) but short of the melt or fuse temperature Tm of the toner resin). A heated platen (heated to approximately the same temperature) is then contacted synchronously with the tacky layer as it translates through the ITB-platen nip. Thus, rather than being transferred electrostatically (based on toner/belt charge differences), it is the tacky nature of the developed layer and heated platen (or previously transferred developed layers) that causes the developed layer to transfer to the platen (or previously transferred developed layers). The platen is heated to keep the toner in a tacky state as it contacts the heated toner/ITB interface, and doing so allows the toner layer to separate from the ITB and transfer under pressure to the platen surface which may contain previously deposited layers.

A post transfuse heating of the layer(s) is then effected to fuse the last layer to the previous layers. Finally a cooling step to bring the temperature of the layer(s) back down to the temperature at which the toner layers are in a tacky state. The platen location is then recycled back to a home position from which it awaits the arrival of the next layer. Repetition of this process in principle allows the build of thicker layers from which a part may be fabricated.

Figure 1:
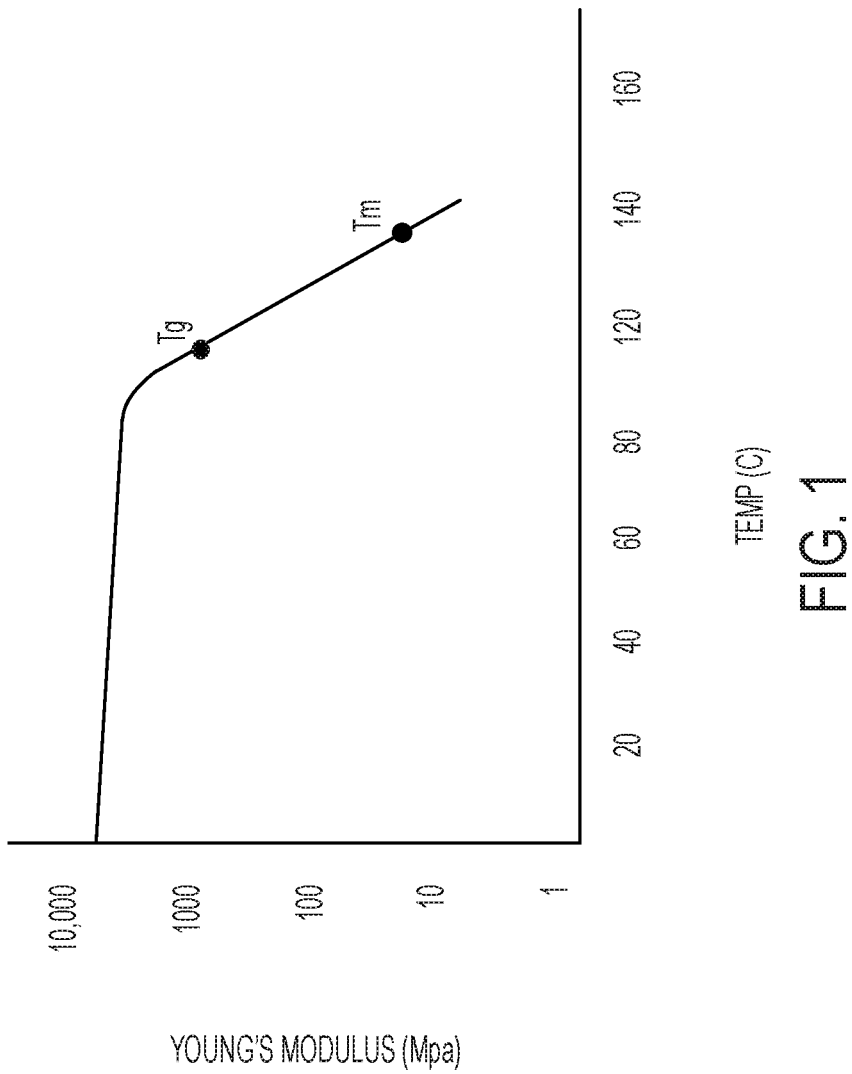
FIG. 1 is a chart illustrating the idealized melt rheology curve of the materials herein.

Many 3-D printing processes provide for co-deposition of a "support" layer which fills in the voids in the part to be produced in order to support the nascent part mechanically. One aspect of the support material is that it has nearly the same melt rheology as the build material in such 3-D printers. The melt rheology requirements can be understood by considering the idealized melt rheology curve for a hypothetical toner resin as shown in FIG. 1. In the initial heating of the developed layer on the ITB as well as the heating of the already formed layers on the platen to the tacky state the toner resin must be heated slightly above Tg but must remain well below Tm so that the integrity of the layers on the platen is maintained during transfuse and the integrity of the transferring layer is also maintained. During the post transfer step a temperature closer to Tm must be imparted to the layers to fuse the uppermost layer to the layers below. So given a particular pre-transfer temperature it is desirable that both the support and build material be in a similar state of tackiness and that the melt points for both be similar as well. This implies that the melt rheology curves for both build and support material is rather similar, otherwise there will be a loss of latitude in the temperature set points and poor transfuse of one or the other material. This requirement sets up strict limitations in the selection of support and build material, i.e. additional work is required to tune the resin chemical structures (e.g. molecular weight, nature of functional groups) to achieve similar melt rheology curves for the two materials.

One general approach to separating the support from the build material is by taking advantage of differences in solubility of the two materials. One would like to make the support material soluble in a solvent which will not dissolve the build material. Generally speaking the latter condition is at odds with the requirement that the melt rheologies be similar. Similar melt rheologies implies similar chemical structures (molecular weight, functional groups) while the solubility disparity implies different chemical structures (different molecular weights and functional groups).

The systems and methods described herein reconcile differing requirements for the build and support material, while improving the mechanical properties (strength, impact resistance, etc.) of the support material made from current toners and resins. With systems and methods herein, the build and support material can be fabricated from a UV radiation curable toner material with the difference being that the support material does not contain a photoinitiator required to make the toner crosslinkable. Because the photoinitiator is present at very low loading it has little to no effect on the melt rheology of the baseline resin. Hence, both support and build material can have nearly identical melt rheology properties, and can be an excellent pair of materials for transfuse.

Crosslinking renders materials/polymers insoluble, thus a solvent which will dissolve the uncrosslinked toner resin will not dissolve the crosslinked toner resin. This results in the support material being separable from the build material as desired. The process of UV curing the build material is incorporated directly in the 3-D process used to build up and fuse together the layers of the build material.

Exemplary UV curable toner contain a resin with ethylenic unsaturation (double bonds) in the resin backbone structure, an optional crosslinking agent which bonds adjacent polymer strands together and a UV photoinitiator. In the materials described below the crosslinking agent is omitted as the polymer backbone of the toner resin contains ethylenic unsaturation which can achieve the desired crosslinking with adjacent polymer backbones. Notwithstanding this, various high temperature stable crosslinking agents can also be incorporated into the build material toner resin, if desired.

Many toners are made by the phase inversion process or Emulsion-Aggregation (EA process). This process results in toners with a very predictable particle size and shape. Potential toner resins containing unsaturation include those previously disclosed in U.S. Pat. Nos. 7,851,549 and in 7,250,238. These materials include (propoxylated bisphenol-A-co-fumarate), poly(ethoxylatedbisphenol-A-co-fumarate), poly(butyloxylated bisphenol-co-fumarate), poly(co-propoxylated bisphenol-co-ethoxylated bisphenol-co-fumarate), poly(1,2-propylene fumarate), poly(propoxylated bisphenol-co-maleate), poly(ethoxylatedbisphenol-co-maleate), poly(butyloxylated bisphenol-co-maleate), poly(co-propoxylated bisphenol-co-ethoxylated bisphenol-co-maleate), poly(1,2-propylene maleate), poly(propoxylated bisphenol-co-itaconate), poly(ethoxylatedbisphenol-co-itaconate), poly(butyloxylated bisphenol co-itaconate), poly(co-propoxylated bisphenol co-ethoxylated bisphenol co-itaconate), and poly(1,2-propyleneitaconate).

Examples of UV-photoinitiators include 2-hydroxy-2-methyl 1-phenyl-1-propanone available from various chemical companies; 1-hydroxycyclohexylphenyl ketone; 2-benzyl-2-dimethylamino-1-(4-morpholinophenyl)-butan-1-one; 2,2-dimethoxy-2-phenylacetophemorpholinyl)-1-propanone. Additional examples of photoinitiators from various chemical companies include but are not limited to 2-hydroxy-2-methyl-1-phenyl-propan-1-one (HMPP); 2,4,6-trimethylbenzoyl diphenylphosphine oxide (TPO); 50-50 Blend of HMPP and TPO; 2-methyl-1 [4-(methylthio)phenyl]-2-morpholino propan-1-one (MMMP); and 2,2-dimethoxy-2-phenyl acetophenone (BDK). Examples of photoinitiators also, include, but are not limited to, 2,4,6-trimethylbenzoyl diphenyl phosphine oxide (Lucirin TPO); alphahydroxyketone; and 2-hydroxy-2-methyl-phenyl-1-propane.

FIG. 1 is a graph illustrating that Young's Modulus (related to viscosity) of a toner resin is a strong function of temperature. The toner resin starts to soften at the glass transition temperature (Tg), below which the material is rather stiff and independent of temperature as shown by the plateau in the curve. Increasing temperature beyond Tg causes the resin to soften further until it flows relatively easily, effectively the melting point Tm of the resin.

Figure 2:
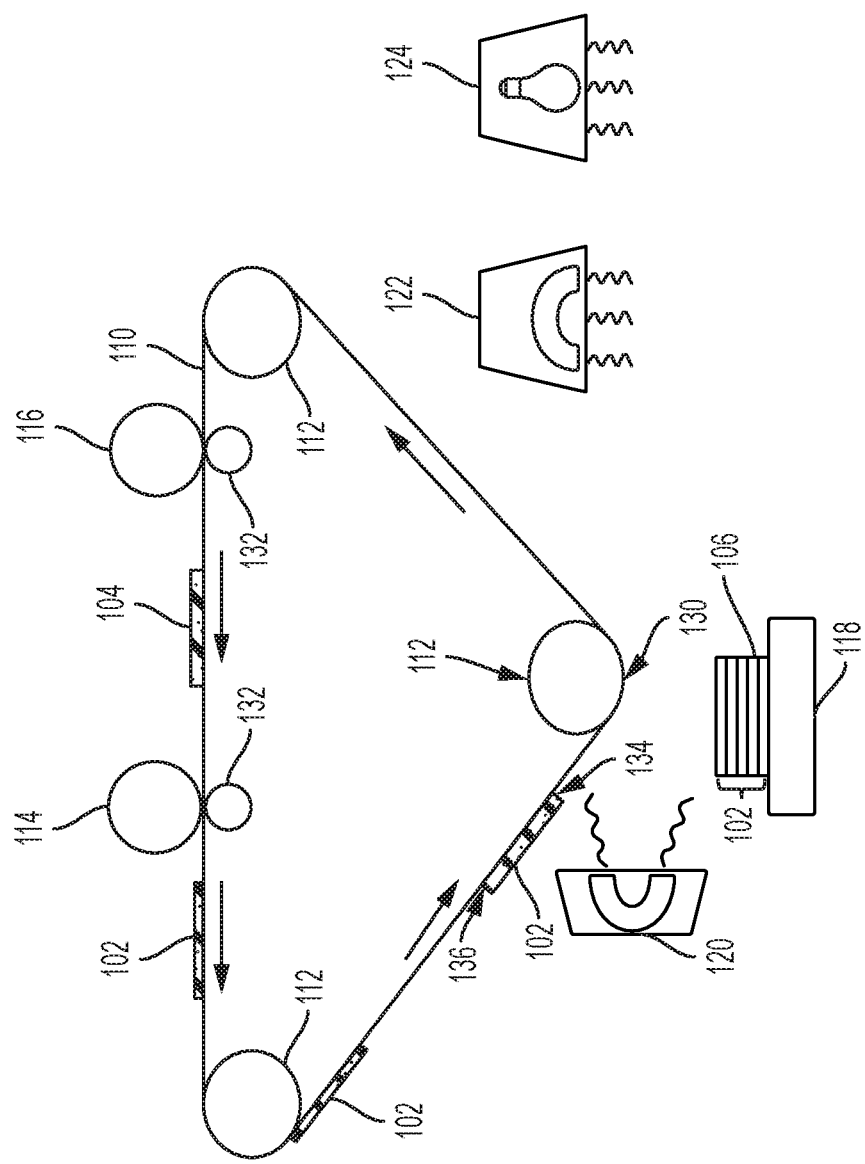
FIG. 2 is a schematic diagram illustrating devices herein.

FIG. 2 is a schematic diagram illustrating devices herein that use an ITB 110 supported on rotating rollers 112, heat, and UV light curing to perform 3-D printing. A first development device 116 transfers build material 104 (by electrostatic toner-based printing processing) to the ITB 110, and a second development device 114 transfers support material to the ITB 110 on top of the previously formed build material 104 (by the same electrostatic toner-based printing processing) to form developed layers 102 on the ITB 110. Item 132 is a charge generator that creates a charge on the opposite side of the ITB 110 in order to draw the build and support material from the development devices 116, 114 to the ITB 110. Thus, developed layers 102 in the drawings are a combination of support material and build material. The developed layers 102 of the first material and the second material are each on a discrete area of the ITB and are in a pattern. As the developed layers 102 approach a transfuse nip 130 (as the ITB moves as shown by arrows) the developed layers 102 and ITB 110 are heated by a heater 120 (e.g., an infrared heater) to just above the Tg of the support and build materials to render both the support and build materials in the developed layers 102 tacky.

While the drawings only illustrate 2 development devices 116, 114, those ordinarily skilled in the art would understand that many more development devices could be utilized to provide different types and different colors of different build material and different support material. Such build and support material are printed in a pattern on the ITB by each separate development device, and combine together in the developed layers 102 to represent a specific pattern having a predetermined length. Thus, each of the developed layers 102 has a leading edge 134 oriented toward the processing direction in which the ITB 110 is moving (represented by arrows next to the ITB 110 in FIGS. 2-6) and a trailing edge 136 opposite the leading edge 134.

Figure 3:
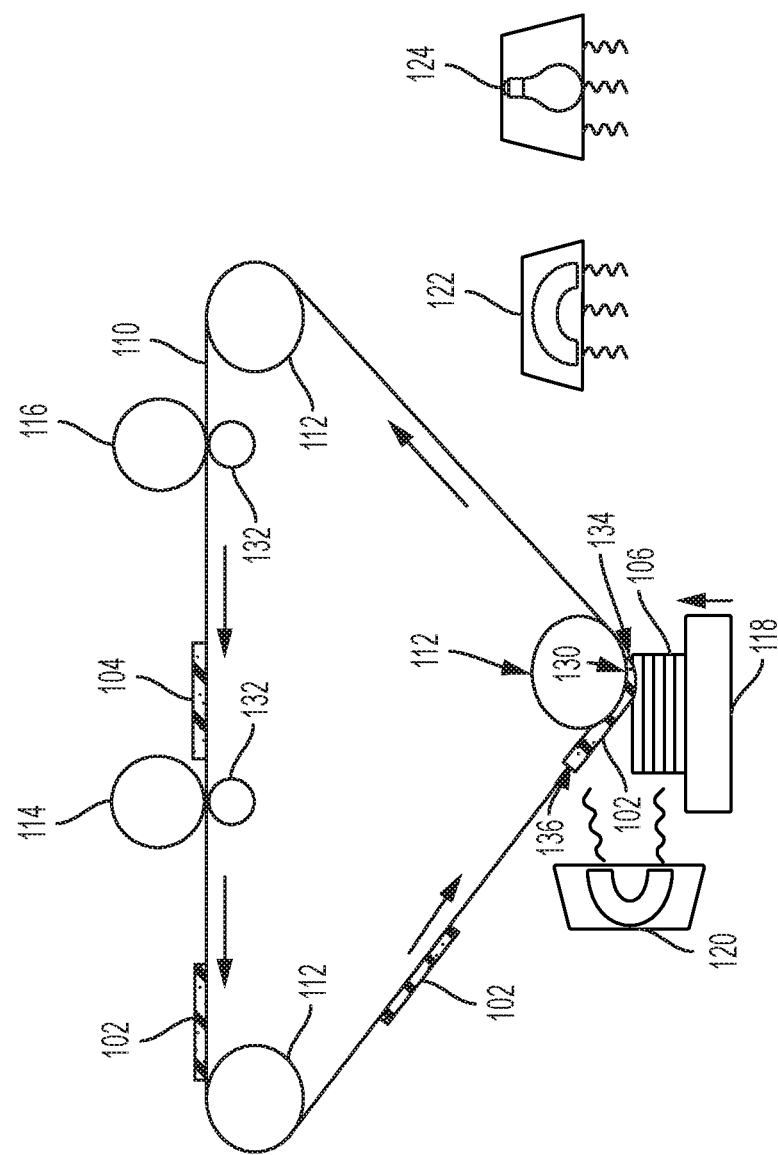
FIG. 3 is a schematic diagram illustrating devices herein.

As shown in FIG. 3, the platen 118 (that may already contain some previously formed developed layers 102, shown as a partially formed part 106) moves toward the transfuse nip 130 so as to contact the heated portion of the ITB 110. At the transfuse nip 130, the leading edge 134 of the developed layer 102 within the transfuse nip 130 begins to be transferred to a corresponding location of the platen 118 or partially formed part 106 that is being built, layer-by-layer. As shown in FIG. 3, the platen 118 moves to contact the developed layers 102 on the ITB 110 at a location where the leading edge 134 of the developed layer 102 is at the lowest location of the roller of the transfuse nip 130. Thus, in this example, the trailing edge 136 of the developed layer 102 has not yet reached the transfuse nip 130 and has not, therefore, yet been transferred to the platen 118 or partially formed part 106.

Figure 4:
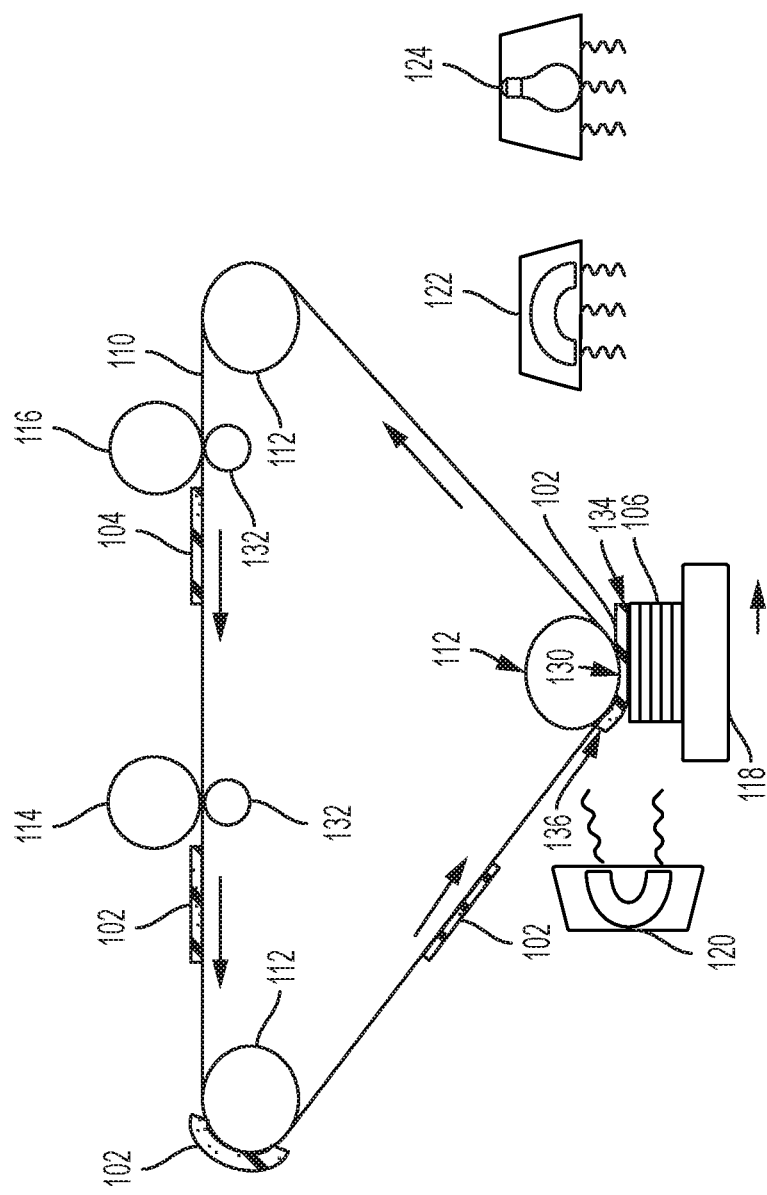
FIG. 4 is a schematic diagram illustrating devices herein.

As shown in FIG. 4, the platen 118 moves synchronously with the ITB 110 (moves at the same speed and the same direction as the ITB 110) to allow the developed layers 102 to transfer cleanly to the platen 118 or partially formed part 106 without smearing. Wax (which is present in emulsion-aggregation toners) is present in the developed layers 102 and assists the tacky developed layers 102 parting from the ITB 110. In FIG. 4, the trailing edge 136 of the developed layer 102 is the only portion that has not yet reached the transfuse nip 130 and has not, therefore, been transferred to the platen 118 or partially formed part 106.

Figure 5:
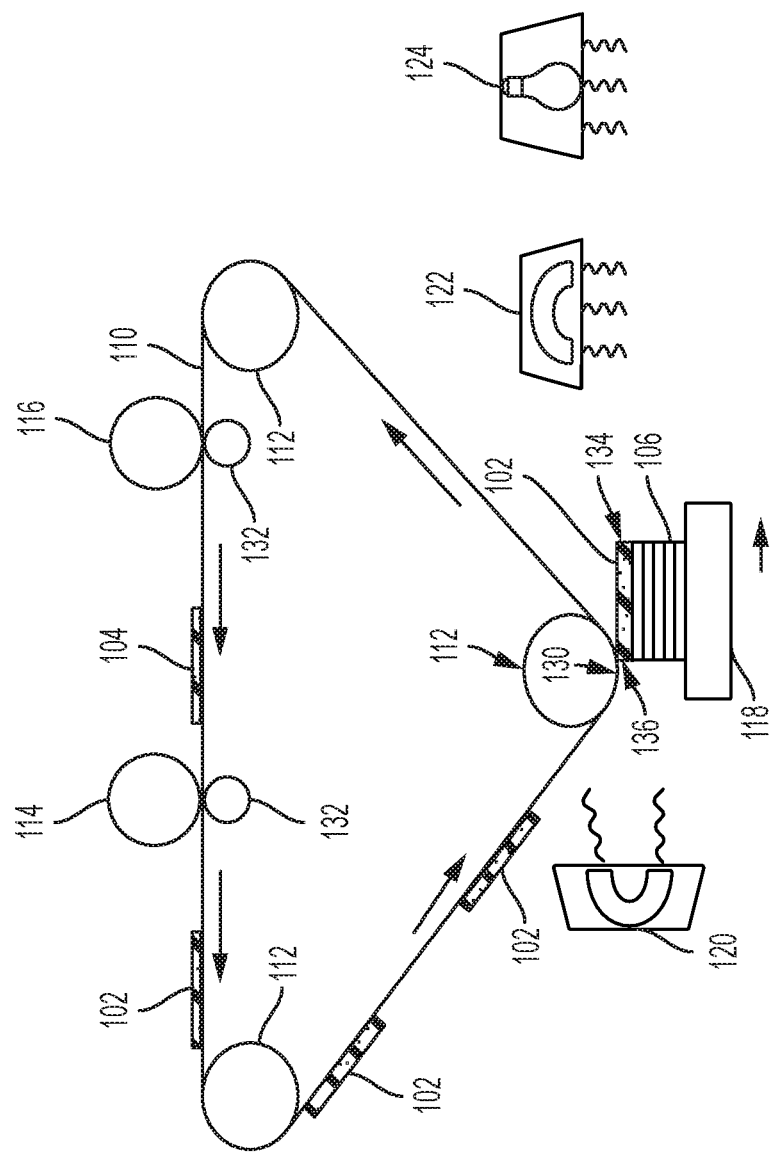
FIG. 5 is a schematic diagram illustrating devices herein.
Figure 6:
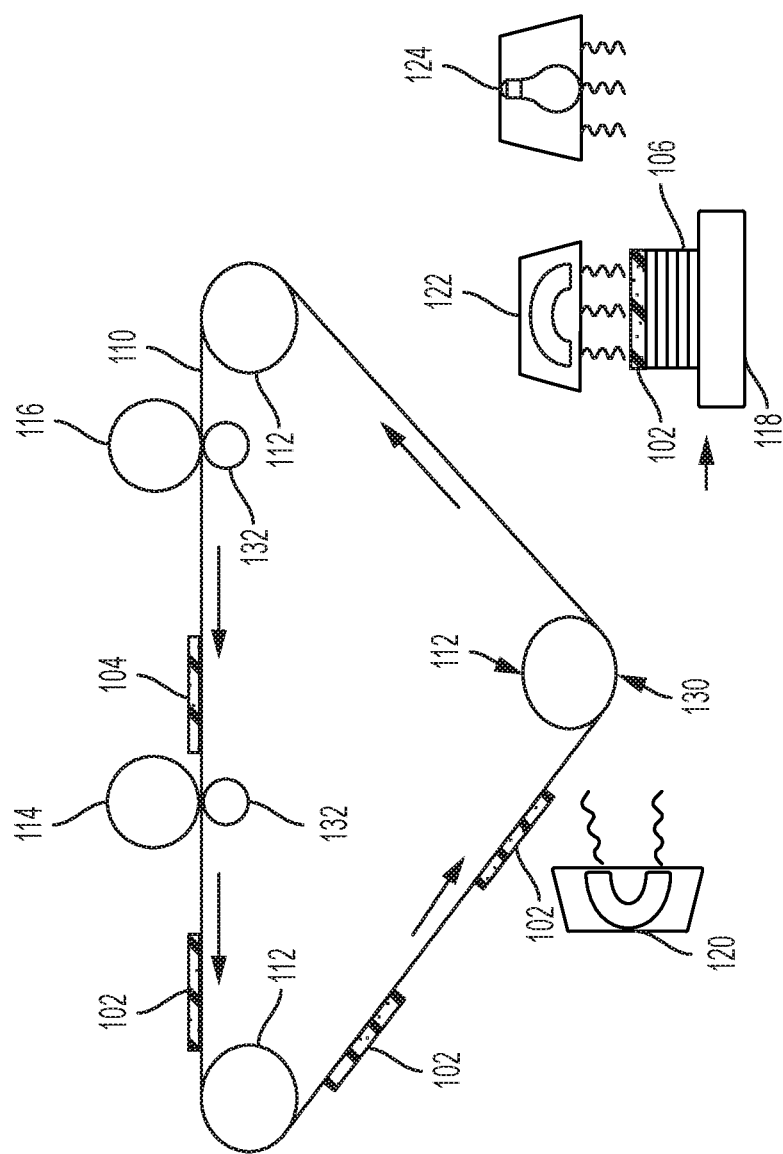
FIG. 6 is a schematic diagram illustrating devices herein.

Then, as shown in FIG. 5, as the ITB 110 moves in the processing direction, the platen 118 moves at the same speed and in the same direction as the ITB 110 (shown in FIG. 4) until the trailing edge 136 of the developed layer 102 reaches the bottom of the roller of the transfuse nip 130 (shown in FIG. 11) at which point the platen 118 moves away from the ITB 110 and over to the heater 122 and UV light source 124, as shown in FIG. 6. This synchronous movement between the platen 118 and the ITB 110 causes the pattern of support and build materials (102) that is printed by the development devices 116, 114 to be transferred precisely from the ITB 110 to the platen 118 or partially formed part 106.

Thus, as shown in FIG. 6, following transfuse of the developed layer 102 to the platen 118, the platen 118 moves away from the transfuse nip 130 and moves to a position to receive heat from another heater 122 (e.g., infrared heat source). As shown in FIG. 6, additional heat from item 122 is applied to the most recently transferred developed layer 102 on the previous developed layers 106 on the platen 118 to fuse the developed layer 102 to those previous developed layers 106 beneath it, as shown in FIG. 6. The temperature of the support and build materials (102) at this point in the processing is near (e.g., within 20%, 10%, 5%, etc.) of the Tm (melting) temperature of the support and build materials of the previous developed layers 102. At this temperature there is sufficient mobility of the individual polymer backbone to physically approach each other.

Figure 7:
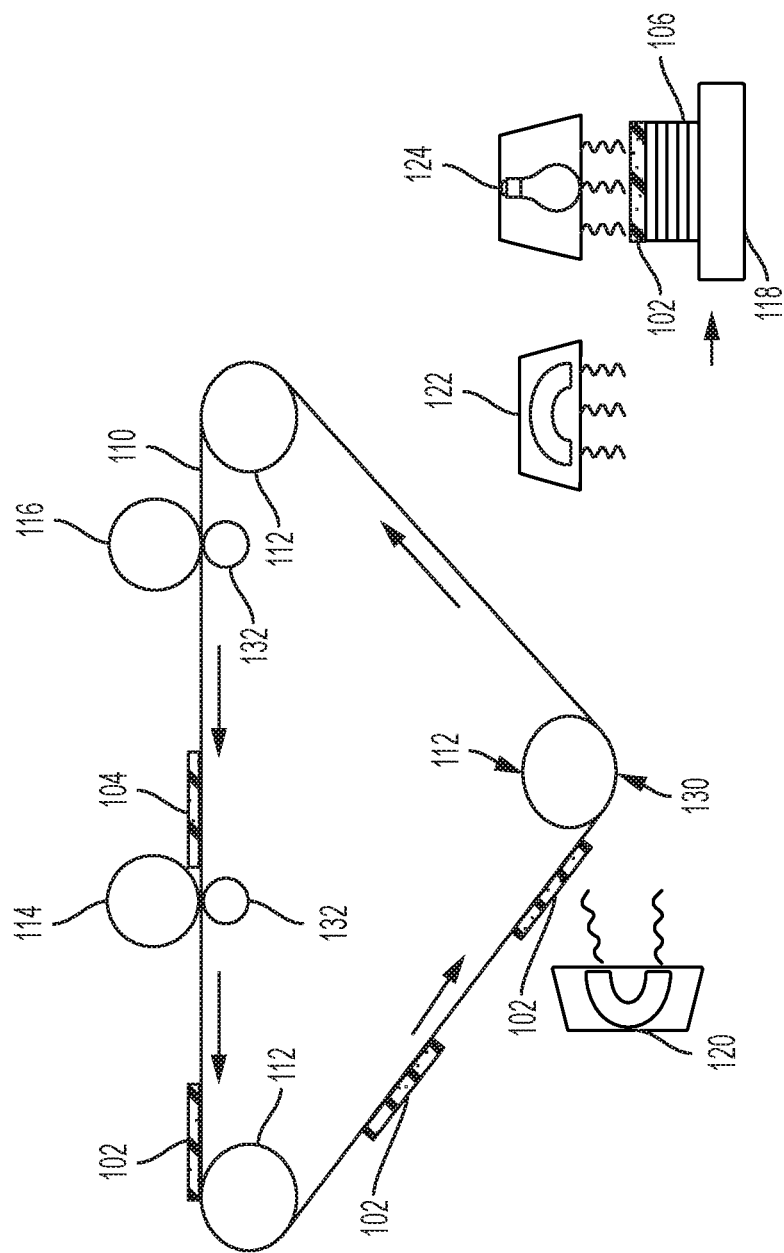
FIG. 7 is a schematic diagram illustrating devices herein.

While the toner resin is in this more liquid-like state, the platen 118 moves to a position to receive light from the light source 124 (e.g., ultraviolet (UV) light source) as shown in FIG. 7. Thus, in FIG. 7, light radiation from light source 124 is applied to the most-recently transferred developed layers 102 added on top of the previous developed layers 106. Because only the build material 104 contains the UV photoinitiator, only the build material 104 is UV crosslinked, leaving the support material from development device 114, in its nominal uncrosslinked state after UV exposure. The actual temperature of UV crosslinking depends on the exact nature of the chemical composition (molecular weight, functional groups) of the toner resin. At this point, the most-recently transferred developed layers 102 has bonded to the previous developed layers 106 on the platen 118 and the platen is moved back to the position shown in FIG. 2, where the previous developed layers 106 on the platen 118 are cooled to nearer Tg, after which the platen 118 can move as shown in FIG. 3 to add an additional developed layer 102.

Figure 8:
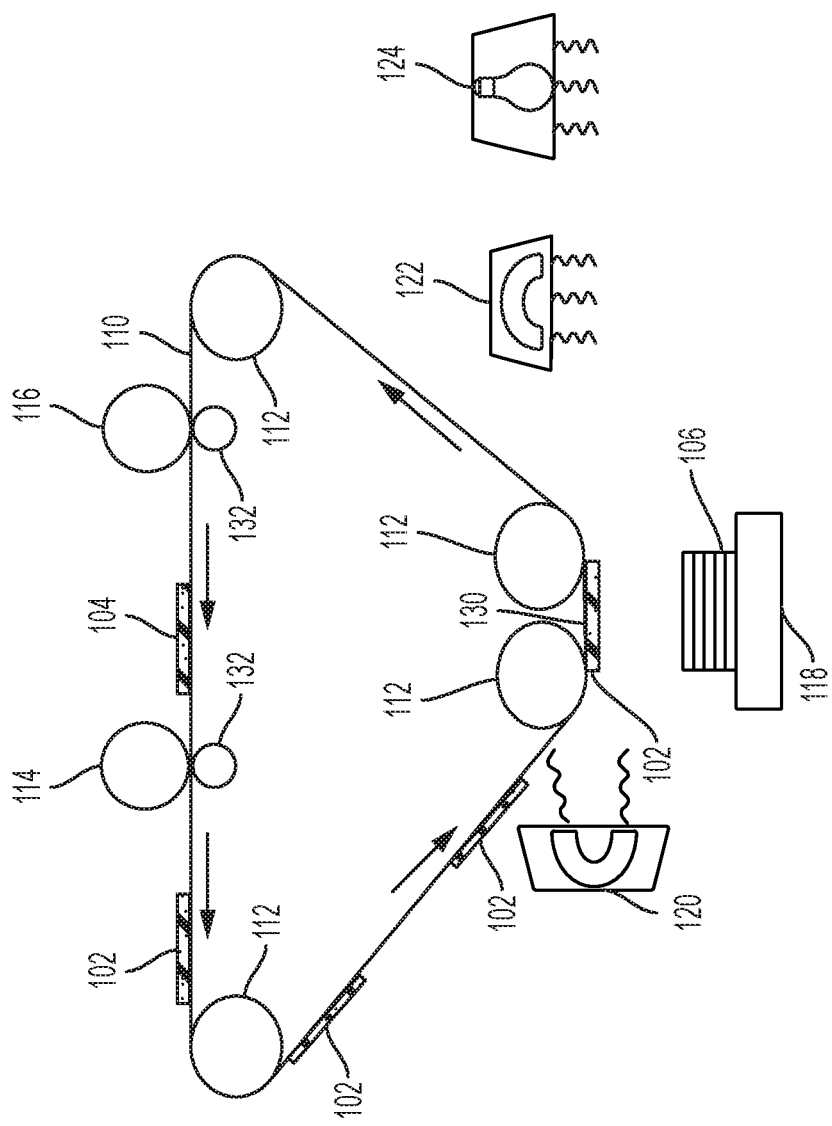
FIG. 8 is a schematic diagram illustrating devices herein.
Figure 9:
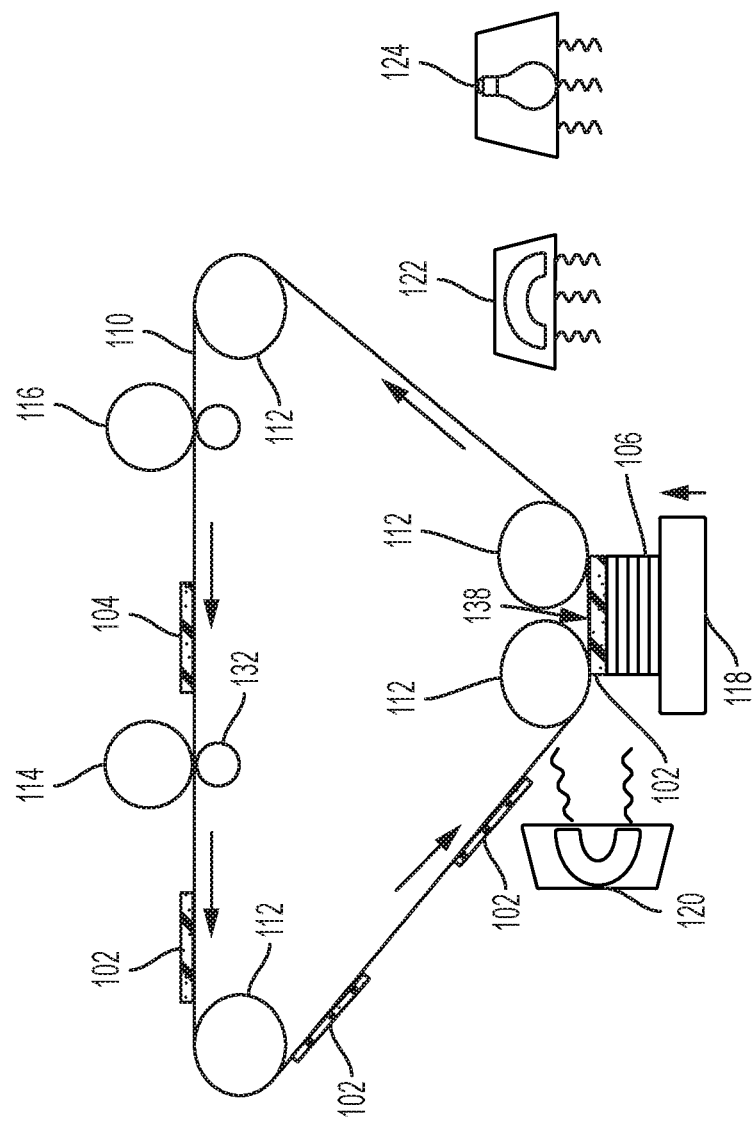
FIG. 9 is a schematic diagram illustrating devices herein.
Figure 10:
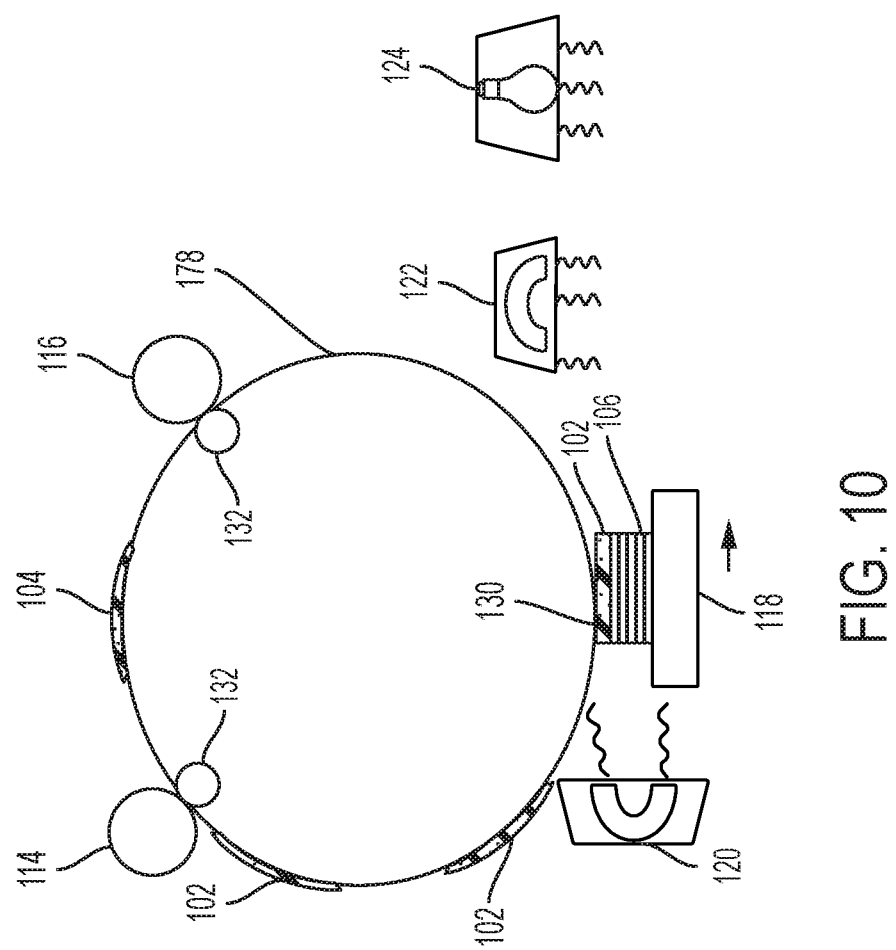
FIG. 10 is a schematic diagram illustrating devices herein.

FIGS. 8 and 9 illustrate an alternative 3-D electrostatic printing structure herein which includes a planar transfuse station 138 in place of the transfuse nip 130 shown in FIG. 2. As shown in FIG. 8, the planar transfuse station 138 is a planar portion of the ITB 110 that is between rollers 112 and is parallel to the platen 118. As shown in FIG. 9, with this structure, when the platen 118 moves to contact the planar transfuse station 138, all of the developed layer 102 is transferred simultaneously to the platen 118 or partially formed 3-D item 106, avoiding the rolling transfuses process shown in FIGS. 3-5. Similarly, as shown in FIG. 10, a drum 178 could be used in place of the ITB 110, with all other components performing as described above.

Figure 11:
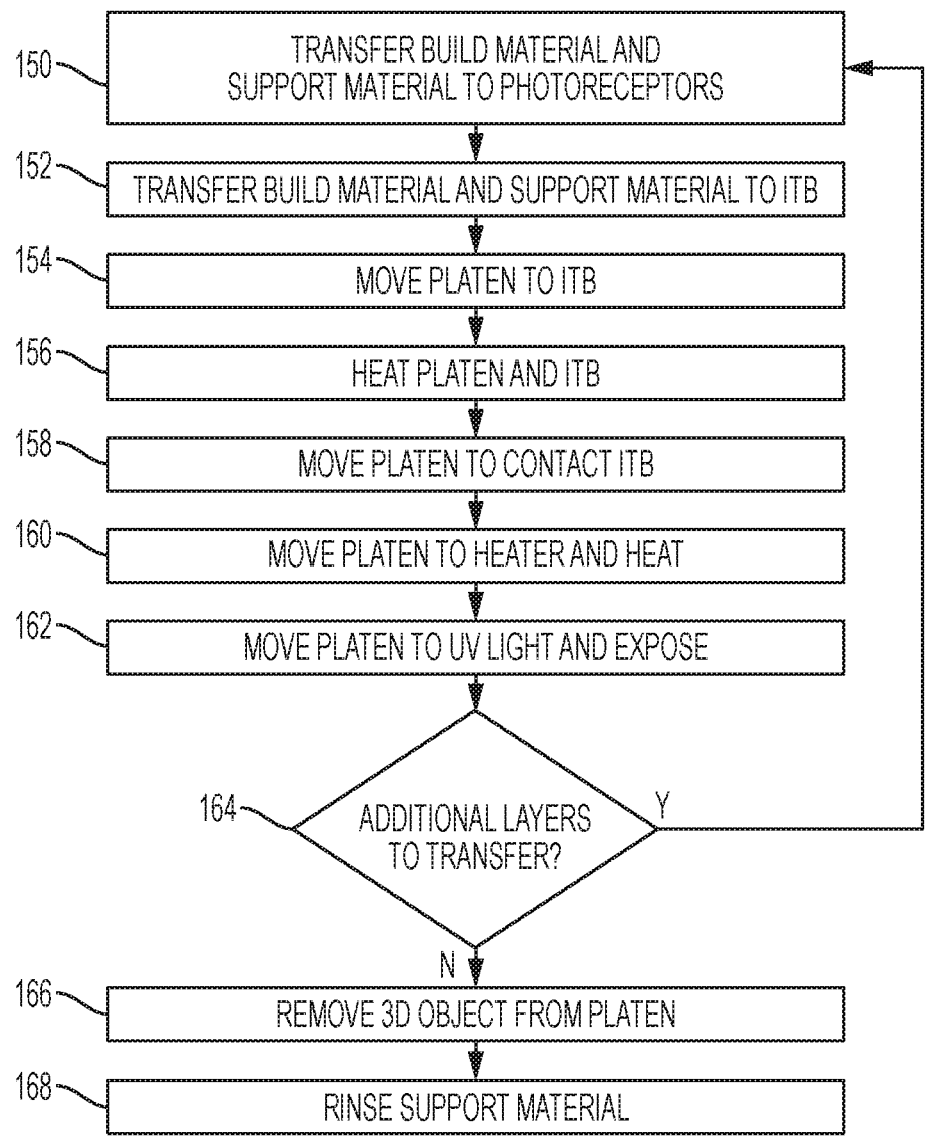
FIG. 11 is a flow diagram of various methods herein.

FIG. 11 is flowchart illustrating exemplary methods herein. In item 150, these methods transfer first material (e.g., build material) to a first photoreceptor and second material (e.g., support material) to a second photoreceptor using exposure and development devices. In item 152, these methods transfer build material from the first photoreceptor and the second photoreceptor to an intermediate transfer belt (ITB). The build material is the same as the support material, except that the build material includes a photoinitiator and the support material does not include the photoinitiator. For example, the build material and support material can comprise ultra-violet (UV) crosslinkable polymer toners that use the photoinitiator to crosslink.

In item 154, such processes move a platen relative to the ITB to be adjacent the ITB. These methods also heat the platen and heat a portion of the ITB that is adjacent the platen using a heater in item 156. After heating in item 156, such methods move the platen to contact ITB in item 158 to transfer the build material and support material to the platen or to previously transferred layers existing on the platen. Successive contacts between the ITB and platen transfer successive layers of build material and support material to the platen (each time the platen contacts the ITB) and this successively builds the 3-D object on the platen.

In item 160, methods herein move the platen from the ITB to a heater to heat the build material and support material. In item 162, methods herein move the platen from the heater to a light (e.g., UV light source) and then expose the heated build material and support material using the light in item 162. The processing shown in item 160 and 162 is performed after each time the platen contacts the ITB, so as to crosslink polymers of build material, without crosslinking polymers of support material. Item 164 determines if additional layers are to be transferred to the partially completed part on the platen and, if so, processing loops back to item 150 until all successive layers are formed and the 3-D object is ready to processed further.

If not, in item 166, after all layers are transferred, subsequent processing removes the 3-D object of build material and support material from the platen, and processing in item 168 applies solvent to the 3-D object using a rinsing station to dissolve only the support material and to leave the build material unaffected. The polymers of build material being crosslinked and the polymers of support material not being crosslinked make the support material selectively soluble in the solvent (relative to the build material).

Figure 12:
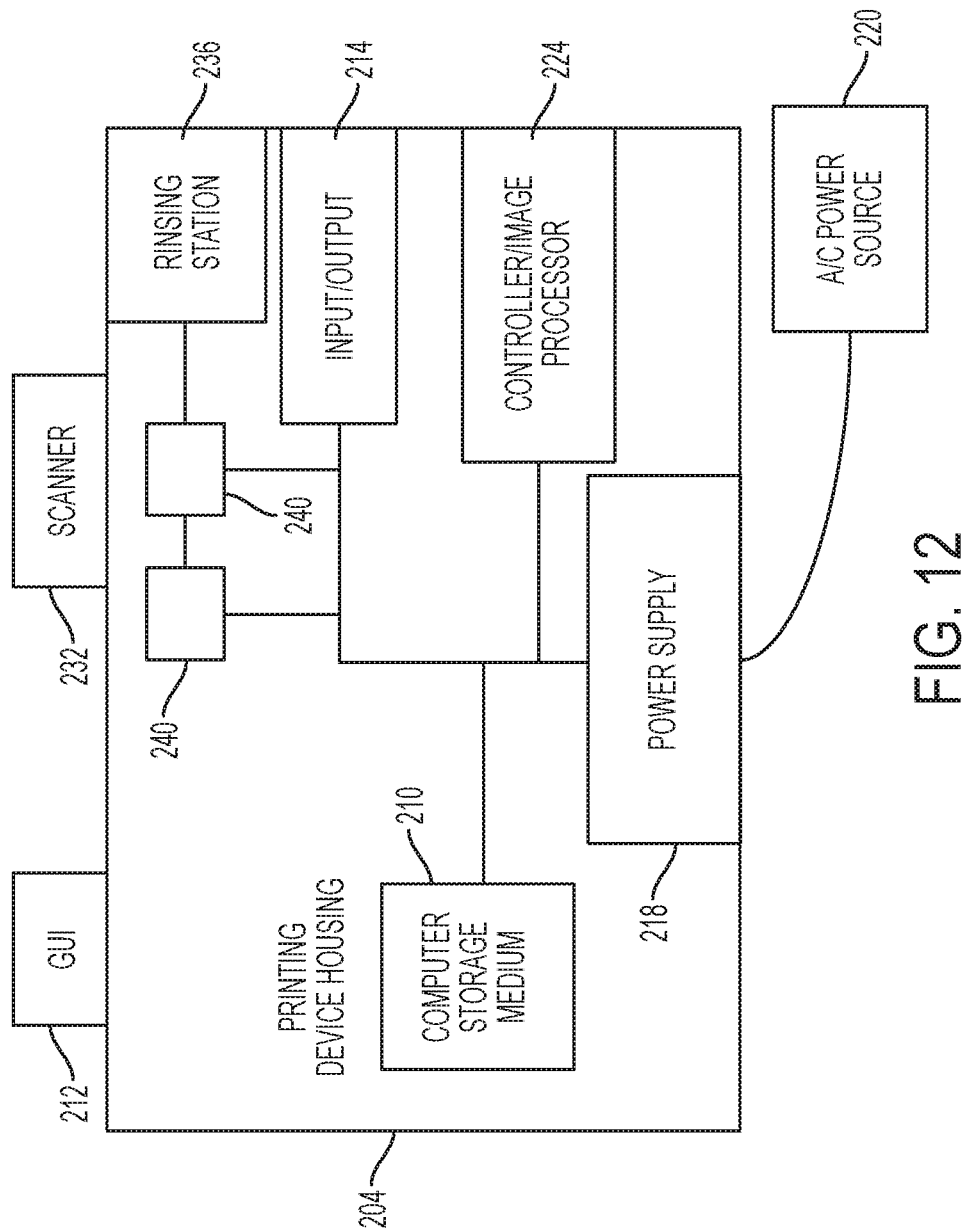
FIG. 12 is a schematic diagram illustrating devices herein.

FIG. 12 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 12, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 13:
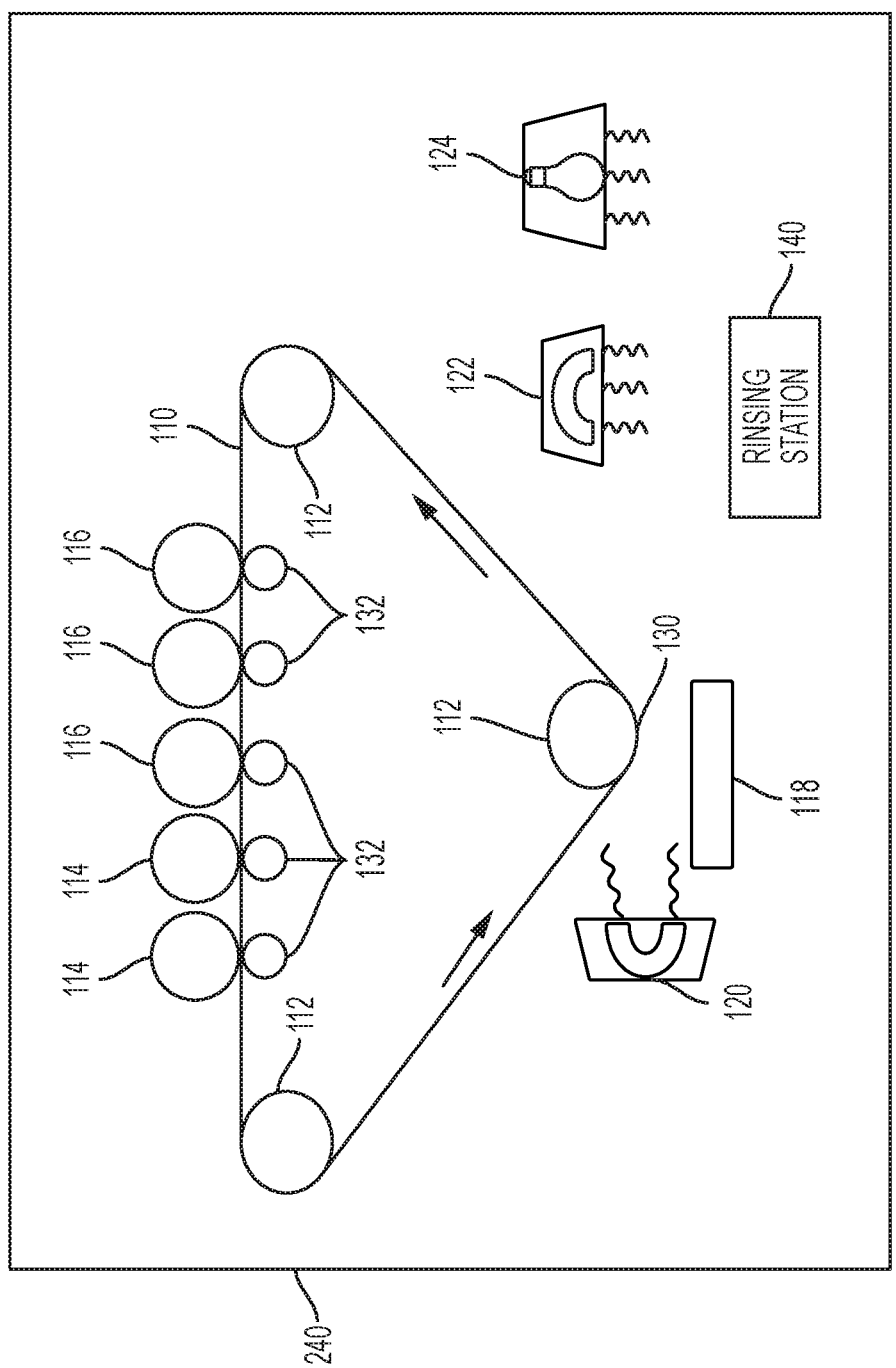
FIG. 13 is a schematic diagram illustrating devices herein.

The one or more printing engines 240 are intended to illustrate any marking device that applies build and support materials (toner, etc.) whether currently known or developed in the future and can include, for example, devices that use an intermediate transfer belt 110 (as shown in FIG. 13).

Thus, as shown in FIG. 13, each of the printing engine(s) 240 shown in FIG. 12 can utilize one or more potentially different (e.g., different color, different material, etc.) build material development stations 116, one or more potentially different (e.g., different color, different material, etc.) support material development stations 114, etc. The development stations 114, 116 can be any form of development station, whether currently known or developed in the future, such as individual electrostatic marking stations, individual inkjet stations, individual dry ink stations, etc. FIG. 13 also illustrates a rinsing station 140 that can apply any form of solvent to the 3-D part formed on the platen 118 to dissolve and rinse away the support material without affecting the build material.

Each of the development stations 114, 116 transfers a pattern of material to the same location of the intermediate transfer belt 110 in sequence during a single belt rotation (potentially independently of a condition of the intermediate transfer belt 110) thereby, reducing the number of passes the intermediate transfer belt 110 must make before a full and complete image is transferred to the intermediate transfer belt 110.

Figure 14:
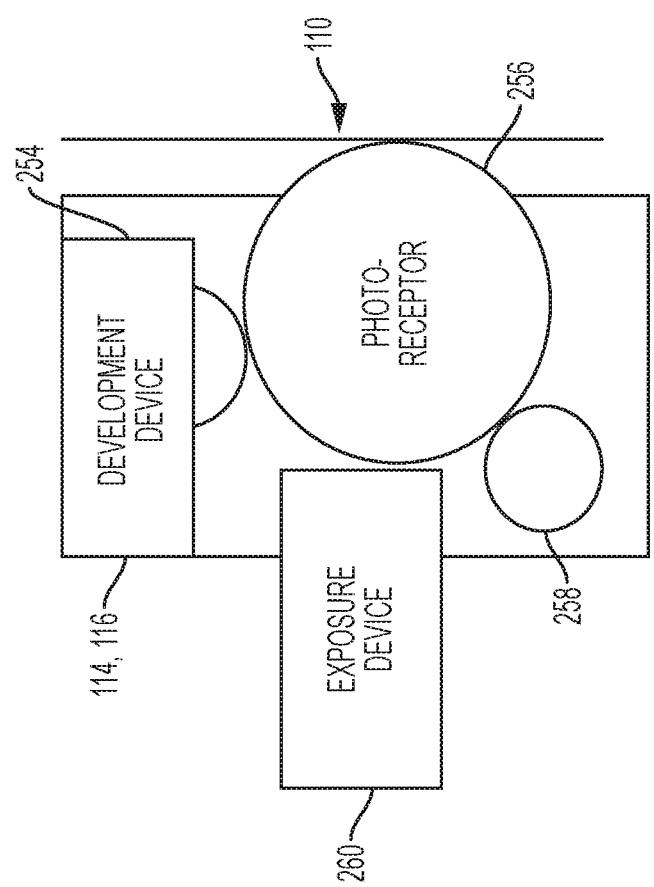
FIG. 14 is a schematic diagram illustrating devices herein.

One exemplary individual electrostatic development station 114, 116 is shown in FIG. 14 positioned adjacent to (or potentially in contact with) intermediate transfer belt 110. Each of the individual electrostatic development stations 114, 116 includes its own charging station 258 that creates a uniform charge on an internal photoreceptor 256, an internal exposure device 260 that patterns the uniform charge, and an internal development device 254 that transfers build or support material to the photoreceptor 256. The pattern of build or support material is then drawn from the photoreceptor 256 to the intermediate transfer belt 110 by way of an opposite charge of the intermediate transfer belt 110 relative to the charge of the build or support material, that is usually created by a charge generator 132 on the opposite side of the intermediate transfer belt 110.

While FIG. 14 illustrate five development stations adjacent or in contact with a rotating belt (110), as would be understood by those ordinarily skilled in the art, such devices could use any number of marking stations (e.g., 2, 3, 5, 8, 11, etc.).

Therefore, as shown above, exemplary three-dimensional (3-D) printers 204 herein include (among other components, an intermediate transfer belt (ITB 110), a first photoreceptor 256 of development unit 116 transferring a first material (e.g., build material) to the ITB 110, and a second photoreceptor 256 of development unit 114 transferring a second material (e.g., support material) to the ITB 110. Thus, exposure devices 260 and development devices 254 transfer build material to the first photoreceptor and support material to the second photoreceptor. The build material is the same as the support material, except that the build material includes a photoinitiator, and optional crosslink material, and support material does not include the photoinitiator. The build material and the support material both comprise ultraviolet (UV) crosslinkable polymer toners that use the photoinitiator to crosslink.

Such 3-D printers 204 also include a platen 118 moving relative to the ITB 110 to make contact with the ITB 110. The ITB 110 transfers successive layers of build material and support material 102 to the platen 118 each time the platen 118 contacts the ITB 110, and this process eventually builds a 3-D object on the platen 118.

At least one heater 120 is also included in such structures, and the heater 120 heats the platen 118 and heats a portion of the ITB 110 that is adjacent the platen 118 to the glass transition temperature of build material and support material 102 prior to the platen 118 contacting the ITB 110. Another heater 122 further heats build material and support material 102 on the platen 118 to a temperature between the glass transition temperature and the melting temperature of build material and support material 102 after the ITB 110 transfers build material and support material 102 to the platen 118, and this fuses build material and support material 102 to previously transferred material on the platen 118.

Such printers 204 also include a light 124 (e.g., UV light source). The platen 118 moves from the ITB 110 to the light 124, and then the light 124 exposes build material and support material 102 on the platen 118 after each time the platen 118 contacts the ITB 110, and this crosslinks polymers of the build material without crosslinking polymers of the support material 102. Various systems herein include a rinsing station 140 that applies solvent to the 3-D object to dissolve only the support material and to leave the build material unaffected. The polymers of build material being crosslinked and the polymers of support material 102 not being crosslinked makes the support material selectively soluble in different solvents than the build material. As would be understood by those ordinarily skilled in the art, the printing device 204 shown in FIG. 12 is only one example and the systems and methods herein are equally applicable to other types of printing devices that may include fewer components or more components.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV light curable acrylate oligomer. Additionally, these aspects relate to a toner composition comprised of a colorant such as a pigment, an optional wax, and a polymer generated from a UV curable cycloaliphatic epoxide.

Furthermore, U.S. Pat. No. 7,250,238 relates to a method of forming a UV curable toner composition. The method comprises preparing a latex of a polymer formed from styrene, butyl acrylate, carboxymethyl acrylate, and a UV curable acrylate; combining the latex with an optional pigment and an optional wax to form a first system; adding flocculant to the first system to induce aggregation and form toner precursor particles dispersed in a second system; heating the toner precursor particles to a temperature greater than the glass transition temperature of the polymer to form toner particles; washing the toner particles; and optionally washing and then drying the toner particles.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printer comprising:
   an intermediate transfer belt (ITB);
   a first photoreceptor transferring a first material to said ITB;
   a second photoreceptor transferring a second material to said ITB, said first material is the same as said second material except said first material includes a photoinitiator and said second material does not include said photoinitiator;
   a platen moving relative to said ITB to make contact with said ITB at a first location, said ITB transferring successive layers of said first material and said second material to said platen each time said platen contacts said ITB at said first location;
   a first heater heating said platen and heating a portion of said ITB that is adjacent said platen to a glass transition temperature of said first material and said second material prior to said platen contacting said ITB;
   a second heater at a second location, said first location where said ITB makes contact with said platen is between said first heater and said second heater, said second heater further heating said first material and said second material on said platen to a temperature between said glass transition temperature and a melting temperature of said first material and said second material after said ITB transfers said first material and said second material to said platen to fuse said first material and said second material to previously transferred material on said platen; and
   a light at a third location, said second heater is between said light and said first location where said ITB makes contact with said platen, said light exposes said first material and said second material on said platen after each time said platen contacts said ITB to crosslink polymers of said first material without crosslinking polymers of said second material, and said polymers of said first material being crosslinked and said polymers of said second material not being crosslinked makes said second material selectively soluble in different solvents relative to said first material.

2. The 3-D printer according to claim 1, said platen moving from said ITB to said light prior to said light exposing said first material and said second material.

3. The 3-D printer according to claim 1, said first material and said second material comprise ultra-violet (UV) crosslinkable polymer toners that use said photoinitiator to crosslink.

4. The 3-D printer according to claim 1, further comprising exposure and development devices transferring said first material to said first photoreceptor and said second material to said second photoreceptor.

5. The 3-D printer according to claim 1, said ITB transferring successive layers of said first material and said second material to said platen building a 3-D object on said platen.

6. A three-dimensional (3-D) printer comprising:
   an intermediate transfer belt (ITB);
   a first photoreceptor transferring a first material to said ITB;
   a second photoreceptor transferring a second material to said ITB, said first material is the same as said second material except said first material includes a photoinitiator and said second material does not include said photoinitiator;
   a platen moving relative to said ITB to make contact with said ITB at a first location, said ITB transferring successive layers of said first material and said second material to said platen each time said platen contacts said ITB at said first location;
   a first heater heating said platen and heating a portion of said ITB that is adjacent said platen to a glass transition temperature of said first material and said second material prior to said platen contacting said ITB;
   a second heater at a second location that is different from said first location, said first location where said ITB makes contact with said platen is between said first heater and said second heater, said second heater further heating said first material and said second material on said platen to another temperature between said glass transition temperature and a melting temperature of said first material and said second material after said ITB transfers said first material and said second material to said platen to fuse said first material and said second material to previously transferred material on said platen; and
   a light at a third location, said second heater is between said light and said first location where said ITB makes contact with said platen, said light exposes said first material and said second material on said platen while said first material and said second material are heated to said another temperature by said second heater after each time said platen contacts said ITB to crosslink polymers of said first material without crosslinking polymers of said second material, said polymers of said first material being crosslinked and said polymers of said second material not being crosslinked makes said second material selectively soluble in different solvents relative to said first material.

7. The 3-D printer according to claim 6, said platen moving from said ITB to said light prior to said light exposing said first material and said second material.

8. The 3-D printer according to claim 6, said first material and said second material comprise ultra-violet (UV) crosslinkable polymer toners that use said photoinitiator to crosslink.

9. The 3-D printer according to claim 6, further comprising exposure and development devices transferring said first material to said first photoreceptor and said second material to said second photoreceptor.

10. The 3-D printer according to claim 6, said ITB transferring successive layers of said first material and said second material to said platen building a 3-D object on said platen.

11. A three-dimensional (3-D) printer comprising:
an intermediate transfer belt (ITB);
a first photoreceptor transferring a build material to said ITB;
a second photoreceptor transferring a support material to said ITB, said build material is the same as said support material except said build material includes a photoinitiator and said support material does not include said photoinitiator;
a platen moving relative to said ITB to make contact with said ITB at a first location, said ITB transferring successive layers containing both said build material and said support material to said platen each time said platen contacts said ITB at said first location;
a first heater heating said platen and heating a portion of said ITB that is adjacent said platen to a glass transition temperature of said build material and said support material prior to said platen contacting said ITB;
a second heater at a second location that is different from said first location, said first location where said ITB makes contact with said platen is between said first heater and said second heater, said second heater further heating said build material and said support material on said platen to another temperature between said glass transition temperature and a melting temperature of said build material and said support material after said ITB transfers said build material and said support material to said platen to fuse said build material and said support material to previously transferred material on said platen; and
a light at a third location, said second heater is between said light and said first location where said ITB makes contact with said platen, said light exposes said build material and said support material on said platen while said build material and said support material are heated to said another temperature by said second heater after each time said platen contacts said ITB to crosslink polymers of said build material without crosslinking polymers of said support material, said polymers of said build material being crosslinked and said polymers of said support material not being crosslinked makes said support material selectively soluble in different solvents relative to said build material.

12. The 3-D printer according to claim 11, said platen moving from said ITB to said light prior to said light exposing said build material and said support material.

13. The 3-D printer according to claim 11, said build material and said support material comprise ultra-violet (UV) crosslinkable polymer toners that use said photoinitiator to crosslink.

14. The 3-D printer according to claim 11, further comprising exposure and development devices transferring said build material to said first photoreceptor and said support material to said second photoreceptor.

15. The 3-D printer according to claim 11, said ITB transferring successive layers of said build material and said support material to said platen building a 3-D object on said platen.

16. A three-dimensional (3-D) printer comprising:
an intermediate transfer belt (ITB);
at least one photoreceptor transferring a first material and a second material to said ITB, said first material is the same as said second material except said first material includes a photoinitiator and said second material does not include said photoinitiator;
a platen moving relative to said ITB to make contact with said ITB at a first location, said ITB transferring successive layers of said first material and said second material to said platen each time said platen contacts said ITB at said first location;
a heater at a second location heating said first material and said second material on said platen to a temperature between a glass transition temperature and a melting temperature of said first material and said second material after said ITB transfers said first material and said second material to said platen; and
a light at a third location, said heater is between said light and said first location where said ITB makes contact with said platen, said light exposes said first material and said second material on said platen after each time said platen contacts said ITB to crosslink polymers of said first material without crosslinking polymers of said second material.

17. The 3-D printer according to claim 16, said platen moving from said ITB to said light prior to said light exposing said first material and said second material.

18. The 3-D printer according to claim 16, said first material and said second material comprise ultra-violet (UV) crosslinkable polymer toners that use said photoinitiator to crosslink.

19. The 3-D printer according to claim 16, further comprising exposure and development devices transferring said first material to said first photoreceptor and said second material to said second photoreceptor.

20. The 3-D printer according to claim 16, said ITB transferring successive layers of said first material and said second material to said platen building a 3-D object on said platen.

* * * * *